(12) United States Patent
Vaara

(10) Patent No.: US 6,967,000 B2
(45) Date of Patent: Nov. 22, 2005

(54) METHOD AND DEVICE FOR FABRICATING COMPOSITE MATERIALS AND BONDED SHEET ITEMS

(75) Inventor: Jan Vaara, Linköping (SE)

(73) Assignee: SAAB AB, Linkoping (SE)

( * ) Notice: Subject to any disclaimer, the term of this patent is extended or adjusted under 35 U.S.C. 154(b) by 0 days.

(21) Appl. No.: 10/477,108

(22) PCT Filed: Apr. 12, 2002

(86) PCT No.: PCT/SE02/00723

§ 371 (c)(1),
(2), (4) Date: Nov. 10, 2003

(87) PCT Pub. No.: WO02/092330

PCT Pub. Date: Nov. 21, 2002

(65) Prior Publication Data

US 2004/0169314 A1 Sep. 2, 2004

(30) Foreign Application Priority Data

May 11, 2001 (SE) .................................. 0101655

(51) Int. Cl.[7] .......................... B29C 43/12; B29C 70/44
(52) U.S. Cl. ...................... 264/510; 264/258; 264/313; 264/314; 264/316; 425/387.1; 425/388
(58) Field of Search ............................. 264/255, 257, 264/258, 313, 314, 315, 316, 510; 425/111, 425/112, 387.1, 388, 577

(56) References Cited

U.S. PATENT DOCUMENTS

| | | | |
|---|---|---|---|
| 4,132,755 A | * | 1/1979 | Johnson ...................... 264/553 |
| 4,305,340 A | * | 12/1981 | Iwaki et al. ................ 72/379.4 |
| 4,755,341 A | * | 7/1988 | Reavely et al. .............. 264/313 |
| 4,915,896 A | | 4/1990 | Rachal et al. |
| 4,942,013 A | * | 7/1990 | Palmer et al. .............. 264/511 |
| 5,015,168 A | | 5/1991 | Boime et al. |
| 5,242,523 A | | 9/1993 | Willden et al. |

(Continued)

FOREIGN PATENT DOCUMENTS

DE 4234002 4/1994

(Continued)

Primary Examiner—Angela Ortiz
(74) Attorney, Agent, or Firm—Swidler Berlin LLP

(57) ABSTRACT

This invention refers to a method and a device for use in connection with the fabrication of multilayer products (8) such as composites and bonded multilayer sheet products, ect. by means of the so-called "bagging technique," to increase the compressive pressure (P) on the product being created beyond normal atmospheric pressure. In the bagging technique, which is used to join a plurality of different material layers with one another to form a unit via polymeric binder layers, atmospheric pressure is normally used to press the various objects together in that they are enclosed in a depressurized gas-impervious bag (9, 21) while the various layers are joined to form a unified product. According to the invention, the atmospheric pressure acting upon the outside of the bag is adsorbed by a first material surface (3+4+5) that is larger than the surface of the multilayer product whose intermediate binder layers are to be caused to join together, while a second material surface (3) facing the opposite direction is used to transfer said composite pressure load (P) to the product to be fabricated. The invention also includes a method and a device for distributing the pressure load (17, 18, 10) laterally in connection with the fabrication of e.g. a U-channel-shaped object with the help of the wedge effect.

6 Claims, 2 Drawing Sheets

U.S. PATENT DOCUMENTS

Figure 1:
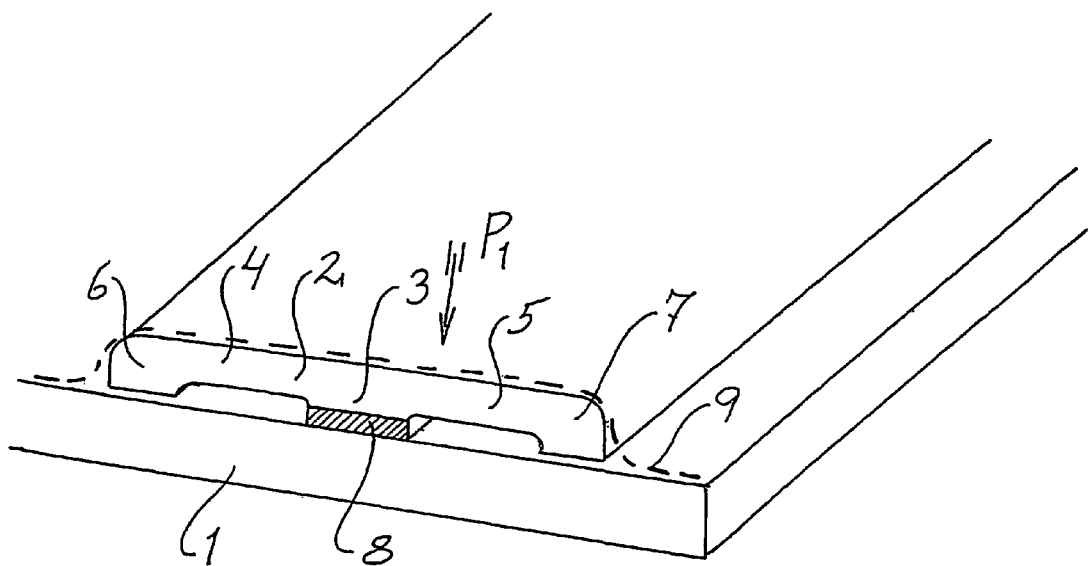

| | | | |
|---|---|---|---|
| 5,242,652 A | | 9/1993 | Savigny |
| 5,451,377 A | * | 9/1995 | Asher et al. ............... 428/167 |
| 6,406,580 B1 | * | 6/2002 | Campbell, Jr. .............. 156/182 |
| 6,666,942 B2 | * | 12/2003 | Campbell, Jr. .............. 156/182 |

FOREIGN PATENT DOCUMENTS

| | | |
|---|---|---|
| JP | 60-206619 | 10/1985 |
| WO | 99/15323 | 4/1999 |

* cited by examiner

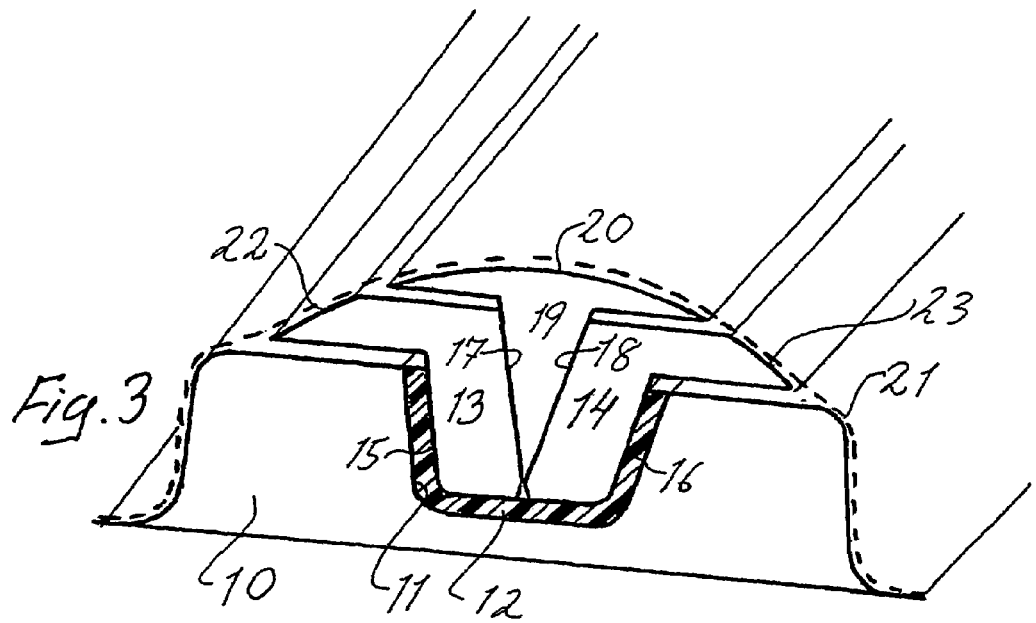
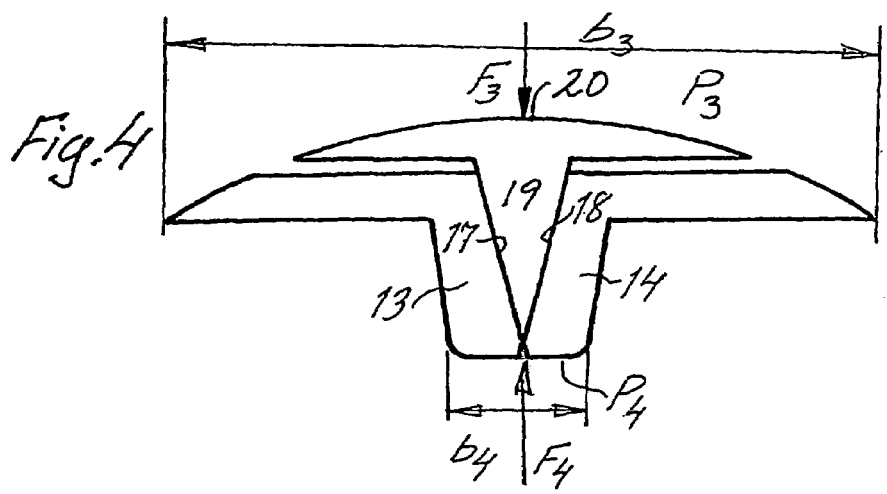
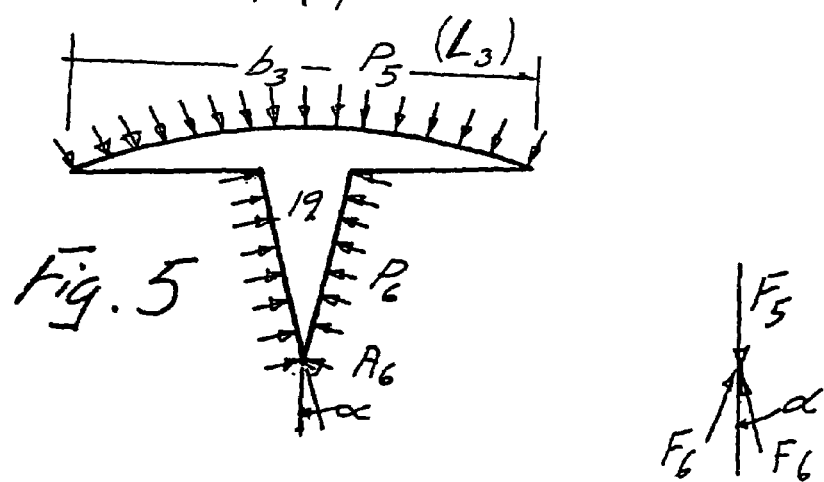

METHOD AND DEVICE FOR FABRICATING COMPOSITE MATERIALS AND BONDED SHEET ITEMS

This invention concerns a method and a device for use in connection with the fabrication of composite materials and bonded sheet items using the so-called "bagging technique" to increase the bonding pressure on specific parts of the fabricated products during fabrication.

The bagging technique is currently used very extensively to press the various layers of composite materials and bonded sheet components together during bonding and while the adhesive is curing. The basis of the technique is that the layers involved in the desired product are, once they have been coated with adhesive and brought together in the desired manner, sealed inside a plastic bag, from which the air is then extracted, thereby creating a pressure difference in the bag relative to the ambient air and thus pressing the layers together in an uniform manner and compacting the material. The pressure difference can then be increased by using an autoclave. In purely general terms, the bagging technique works very well for a very large number of different applications. It is used mainly in the fabrication of different types of laminates of metal, polymeric binders and fiber reinforcements, and in the fabrication of bonded multilayer sheet products. Problems arise with the technique mainly in connection with the fabrication of items whose adhesive bonds require higher pressures than those normally generated using the bagging technique, and which cannot be achieved even if an autoclaved is used. Problems may also arise in cases where the required autoclave is unavailable. In addition, it has been found difficult to use the bagging technique to produce interior corners with a sufficient degree of dimensional precision in cases where the interiors of the corners must, for reasons relating to molding and forming practice, face toward the bag.

Different variants of the bagging technique have been described in such a large number of different patents, books and articles that we can cite only a few to provide an idea of the state of the art.

The fabrication, using the bagging technique, of flat composite materials containing thermoplastic binders heated to their melting point while the starting material is kept under pressure in a vacuum bag is described in U.S. Pat. No. 4,915,896.

U.S. Pat. No. 5,242,523 describes the use of a partially modified bagging technique to fabricate complete panels by bonding finally-formed but not finally-cured stringers and support beams onto similarly finally-formed but not finally-cured cover sheets. The method described there is based on the use of an intermediate layer in the form of heat-resistant flexible rubber mats that are arranged to distribute pressure between the vacuum bag and the various panel components, which are disposed against one another in the desired manner.

Yet another way of using rubber material to distribute pressure between a vacuum bag and a plurality of different composite components that are to be bonded together and have external conformations that make it difficult to achieve the desired pressure distribution over all the critical surfaces using only one vacuum bag of standard design is described in U.S. Pat. No. 4,755,341. According to the method described there, the relevant composite components are covered with a free-flowing quantity of particulate silicon rubber that is in turn covered with a conventional vacuum bag that will thus load the silicon rubber particles, which will in turn transfer the pressure load to all the secondary surfaces of the composite components.

As was noted in the preamble, it is difficult to use the bagging technique to produce interior corners with high dimensional precision in those cases where the interiors of the corners must, for reasons related to manufacturing practice, face toward the bag. One way to solve this problem is described in U.S. Pat. No. 5,015,168. The method described there is based on arranging special calibration parts that define the inner dimensions of the corners in question on the outside of the vacuum bag, so that the relevant dimensions can be set precisely, using the bag as an intermediate layer. One major disadvantage of this method is that the special calibration parts must be capable of being placed in extremely well-defined final positions, which in turn entails a need for special fastening devices for the calibration parts, thus ultimately making for quite a complex arrangement.

The present invention now offers, in connection with the bagging method, both a general means of increasing the pressure on the components placed in the bag during curing and a means, proceeding from the same basic concept, of producing interior corners with a high degree of dimensional precision. The invention can be used either together with an autoclave treatment, whereupon it is possible to increase the pressure markedly, or to replace a current conventional autoclave treatment, since the autoclave treatment is often a bottleneck in the fabrication process, and the possibility of being able, at least under certain circumstances, to omit a previously necessary autoclave treatment is probably the most important gain offered by the invention.

The basic principle of the invention is now that we will create a larger surface to be loaded by the ambient air pressure than the material surface to be pressure-treated, and that the total pressure on the larger surface will be distributed over the surface to be pressure-treated. What is required to implement the invention is thus a movable tool part with a larger first surface that faces the interior of the bag, a second smaller surface that faces in the opposite direction and is brought into contact with the item which is to be pressure-treated, and a vacuum bag that must cover the entire tool part.

To summarize, the basis of the invention may thus be considered to be that the effect of the atmospheric pressure on a larger surface is distributed over the smaller surface of the product that one intends to fabricate. The increase in pressure to which the product can be subjected by this means during its fabrication will thus be proportional to the differences between these two areas. In order for it to be possible to implement the invention, both the larger and the smaller surface, which appropriately consist of the two confronting sides of a press die, must thus be arranged within the volume delimited by the bag used according to the basic method, and in which the pressure is lowered by pumping out air.

The invention also includes a variant that makes it possible to angle the pressure load laterally by means of a wedge-shaped element that is forced by a pressure surface in the main direction of the actuating pressure so as to simultaneously, as a result of its wedge action, force thereto adapted inner shaping elements laterally away from the direction of movement of the wedge. This latter variant of the invention is particularly well suited for use in the fabrication of high-precision interior corners, in that the movable inner shaping elements can be used to force treated material into tight abutment with its outer flanks against fixed outer shaping elements. The movable inner shaping elements will thus, according to this method, define the interior corners of the finished product, while the fixed outer shaping elements will define all of the outer corners of the product parts.

The invention is described in detail in the claims below, and will now be described in only somewhat greater detail with reference to the accompanying figures.

Figure 2:
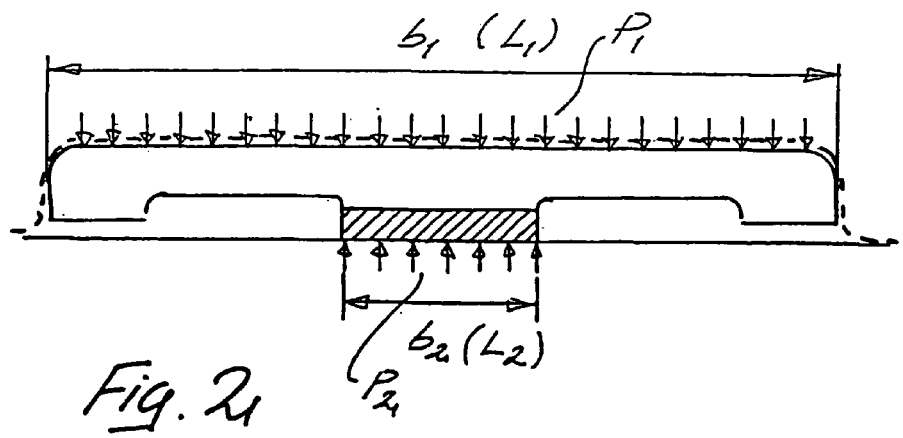

The figures show the following:

FIG. 1 shows a section through an oblique projection of a device for implementing the basic invention, while FIG. 2 provides the background for a calculating model showing the benefits that the invention offers, and FIG. 3 shows a section through an oblique projection of a advancement of the invention, and FIGS. 4 and 5 refer to a calculating model/exemplary calculation based on the device according to FIG. 3.

The general device for implementing the invention shown in FIG. 1 comprises a first tool part 1 in the form of a counter-die 1, a second tool part 2 that is movable relative to the counter-die 1 and exhibits a centrally arranged support 3, and two side pieces 4 and 5 that protrude on either side of the support piece, each of which terminates in a stop lug 6 and 7. The support piece 3 is adapted for the composite component or bonded component 8 whose various layers are to be joined together in that their intermediate binder layers will set under pressure between the tool parts. The sole purpose of the support lugs 6 and 7 is to ensure that the tool part 2 does not cant when a pressure $P_1$ is applied to the upper surface of the tool part 2. Because the present example pertains to a variant of the bagging method described above, this pressure is produced in that the entire tool setup is enclosed in a gas-tight bag 9, after which the air is pumped out of the bag 9. The combined area that will now be acted upon by the atmospheric pressure consists of the combined area corresponding to support surface 3 plus the surface of the two side pieces 4 and 5. The item 8 will then be loaded by the entire pressure $P_1$, which means that the compression of the item 8 will have been increased, since the area upon which the air pressure is acting, i.e. 4+5+3, considerably exceeds the area 3 in size.

If we assume that both parts 1 and 2 of the tool are of length L, then the following mathematical relation can be formulated based on the general designations specified for FIG. 2.

If $b_1 = 4\ b_2$ and $L_1 = L_2$ while $P_1 \times b_1 \times L_1 = P_2 \times b_2 \times L_2$ then $P_1 \times b_1 = P_2 \times \frac{1}{4} \times b_1$ which yields $P_2 = 4 \times P_1$ FIGS. 3–5 illustrate a variant of the invention in which we utilize not only the option of increasing the load, i.e. the compression, but also extend the compression out laterally so that it also becomes possible to fabricate interior corners with very high precision. In this variant we use a first tool part 10 designed with a groove 11 conformed to the outer contours of a desired U-channel. The starting material 12 for the desired U-channel is then arranged in said groove. Two mirror-image-shaped shaping elements 13 and 14 are then arranged in this U-channel material 12. The outer sides 15 and 16 of the shaping elements that face the material 12 are intended to define the inner shape of the U-channel, while mutually opposing lateral edges 17 and 18 are arranged obliquely in relation to the dividing line between them. A wedge element 19 is then introduced down between the oblique lateral edges 17 and 18. The wedge element 19 is moreover fixedly connected to the pressure-loading area 20. The entire device is furthermore inserted into a bag 21 of the type discussed above, from which bag the air is then pumped out, whereupon the atmospheric pressure loads the area 20, driving the wedge 19 down between the shaping elements 13 and 14, whereupon they are pressed both down against the bottom of the groove 11 and out towards its lateral edges, whereupon the material 12 is thereby compressed and given its desired final conformation. As the figure shows, the shaping elements 13 and 14 also have their own loading areas 22 and 23, which are acted upon by the atmospheric pressure, and press the shaping elements down into the groove 11.

The following general relations may then be formulated for the device illustrated in FIG. 3. If the parts 13, 19 and 14 are assumed to comprise a unit, then the situation shown in FIG. 4 is applicable, where $F_3 = P_3 \times b_3 \times L_3$ while $F_4 = P_4 \times b_4 \times L_3$ whereupon $L_3$ refers to the length of the tool and the fabricated product, and an equation of equilibrium yields $F_3 - F_4 = 0$ $P_3 \times b_3 \times L_3 - P_4 \times b_4 \times L_3 = 0$ $P_4 = P_3 \times b_3 : b_4$ whereupon, if $b_3 = 3 \times b_4$, we obtain $P_4 = P_3 \times 3\ b_4 : b_4 = 3\ P_3$ However, we obtain the following relation if we instead assume that 19 is movable relative to 13 and 14:

$A_5 = b_3 \times L_3$ $F_5 = P_5 \times A_5$ $F_6 = P_6 \times A_6$, which yields $F_5 = 2 \times F_6 \cos \alpha$ $F_6 = F_5 : 2 \cos \alpha$, which yields $F_6 \infty$ when $\alpha 90°$

What is claimed is:

1. A method for the fabrication of multilayer products comprising:
   joining a plurality of different layers with one another to form a multilayer product via polymeric binder layers; wherein
   the layers, inside a gas-impervious bag that is depressurized relative to an ambient atmosphere, are subjected to a compressive pressure higher than that of the ambient atmosphere while the various layers are joined into a unified product, wherein the ambient atmospheric pressure acting upon the outside of said bag is absorbed as a composite pressure load by a material having a first surface that is larger in area than the surface area of the multilayer product;

wherein said material has a second surface opposite the first surface to transfer said composite pressure load to the layers of the multilayer product to be fabricated confronting said second surface;

wherein the layers forming the multilayer product are compressed at a pressure higher than the ambient atmospheric pressure;

wherein said composite pressure load is used to compress the multilayer product to be fabricated between said second surface and a fixed counter-die; and wherein the combined total pressure load on the first surface is distributed in a plurality of directions through the use of a wedge effect between an element connected to and axially displaced by said first surface and other elements that interwork therewith.

2. The method according to claim 1, wherein at least parts of said composite pressure load are extended out in at least one other direction that forms an angle to said first surface through the use of the wedge effect between at least one first sliding surface arranged obliquely relative to said first surface and a second sliding surface conformed to said first sliding surface.

3. A device for fabricating multilayer products, comprising, a counter-die on which the product to be fabricated can be placed;

a press die that is arranged so as to be freely movable relative to the counter-die, having:

a first surface or loading area that faces away from the counter-die and that is larger in surface area than the area of the product that is to be fabricated; and a second surface that confronts the counter-die and is conformed to the product to be fabricated, wherein the entire press die and the product to be fabricated are arranged inside a depressurized gas-impervious bag;

wherein the second surface of the press die that confronts the product to be fabricated is realized centrally with the excess area of the loading area uniformly distributed thereabout; and wherein said press die is designed with a wedge-shaped element or cam that protrudes from its second surface in a direction away therefrom and is intended to interwork with shaping elements that are disposable on either side thereof by the wedge-shaped element when it is displaced toward the product in question, and displaceable transversely to the direction of motion of the cam.

4. The device according to claim 3, wherein said counter-die is supplemented with a counter-die that is counter-directional relative to said shaping elements.

5. The device according to claim 4, wherein the counter-die is designed with a groove that defines the outer contours of a desired product, while said shaping elements are designed so that, with a degree of play equivalent to the material thickness of the desired product, they fit into said groove, wherein their lateral edges confronting the counter-die define the inner contours of the desired product, and where said wedge-shaped element or cam is designed to be able to be pressed down between the shaping elements so as to press them outward and downward into the groove of the counter-die by interworking with the oblique surfaces realized in said shaping elements.

6. The device according to claim 5, wherein the desired product is a U-channel.

* * * * *